(12) United States Patent
Koibuchi

(10) Patent No.: US 6,405,116 B1
(45) Date of Patent: Jun. 11, 2002

(54) VEHICLE DECELERATION UNIT AND VEHICLE DECELERATION CONTROL METHOD

(75) Inventor: Ken Koibuchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/621,010

(22) Filed: Jul. 20, 2000

(30) Foreign Application Priority Data

Aug. 17, 1999 (JP) ........................................... 11-230781

(51) Int. Cl.$^7$ ................................................ G06F 7/00
(52) U.S. Cl. ............................ 701/70; 701/72; 701/73; 701/93; 701/96; 180/170; 340/441
(58) Field of Search ............................... 701/70, 72, 73, 701/74, 78, 79, 80, 93, 96; 180/168, 170; 340/903, 435, 436, 441

(56) References Cited

U.S. PATENT DOCUMENTS 5,731,977 A * 3/1998 Taniguchi et al. .... 364/426.044
5,752,214 A * 5/1998 Minowa et al. ............. 701/111
5,934,399 A * 8/1999 Iiboshi et al. ................ 180/169

FOREIGN PATENT DOCUMENTS

JP         A-10-338056        12/1998

* cited by examiner

Primary Examiner—Yonel Beaulieu
(74) Attorney, Agent, or Firm—Oliff & Berridge, PLC

(57) ABSTRACT

A vehicle deceleration unit has a power train decelerator which controls a power train output to decelerate the vehicle and a brake device which presses a frictional member against a wheel or a rotational member rotating together with the wheel. Upon issuance of a demand for deceleration of the vehicle, the vehicle is decelerated by means of power train output control through the power train decelerator and brake control through the brake device. The vehicle deceleration unit has a target deceleration determiner for detecting a target deceleration, a turning state detector for detecting a turning state of the vehicle, and a control amount calculator for calculating a power train output control amount and a brake control amount based on the target deceleration and the turning state. The vehicle deceleration unit makes it possible to stably decelerate the vehicle regardless of a turning state of the vehicle.

18 Claims, 4 Drawing Sheets

VEHICLE DECELERATION UNIT AND VEHICLE DECELERATION CONTROL METHOD

INCORPORATION BY REFERENCE

The disclosure of Japanese Patent Application No. HEI 11-230781 filed on Aug. 17, 1999 including the specification, drawings and abstract is incorporated herein by reference in its entirety.

BACKGROUND OF THE INVENTION

1. Field of the Invention

The present invention relates to a vehicle deceleration unit performing deceleration control of a vehicle and, more particularly, to a vehicle deceleration unit and a vehicle deceleration method wherein a control amount relating to deceleration of the vehicle is determined based on the turning state of the vehicle.

2. Description of the Related Art

When decelerating a vehicle, hydraulic pressure is generated through depression of a brake pedal by a driver. This hydraulic pressure is directly transmitted to wheels and inhibits the wheels from rotating. However, in recent years, various control devices installed in the vehicle assist deceleration control of the vehicle upon detection of a demand for deceleration of the vehicle (both a demand for deceleration based on the driver's intention and a demand for deceleration based on other factors). Also, various control devices installed in the vehicle perform deceleration control of the vehicle. In this case, various control devices control a power train output (by reducing an engine output or performing a shift-down operation). In some cases, the hydraulic pressure generated by various control devices is transmitted to the wheels, whereby the vehicle is decelerated. Japanese Patent Application Laid-Open No. HEI 10-338056 discloses a device that performs such deceleration control. The device disclosed in Japanese Patent Application Laid-Open No. HEI 10-338056 is a follow-up traveling control device that automatically decelerates a vehicle in accordance with a distance between the vehicle and another vehicle traveling ahead of the vehicle.

However, if deceleration control is performed when the vehicle is making a turn close to a limit state, the vehicle may become destabilized causing the vehicle to skid or steer out of the control of the driver. For example, in the case where a rear-wheel-drive vehicle equipped with a follow-up traveling control device that controls a power train output to maintain a distance between the vehicle and another vehicle traveling ahead of the vehicle, deceleration control based on power train output control has an effect only on the driven rear wheels. If this vehicle is making a turn close to the limit state, the vehicle may be destabilized. However, deceleration control based on power train output control in a front-wheel-drive vehicle has an effect only on the driven front wheels. If the vehicle is making a turn close to the limit state, it may tend to deviate outwardly.

SUMMARY OF THE INVENTION

It is an object of the present invention to provide a vehicle deceleration unit that can stably decelerate a vehicle regardless of a turning state of the vehicle.

In order to solve the aforementioned problem, according to a first aspect of the present invention, there is provided a vehicle deceleration unit comprising a power train decelerator which controls a power train output to decelerate a vehicle and a brake device which presses a frictional member against a wheel or a rotational portion rotating together with the wheel to decelerate the vehicle, wherein the vehicle is decelerated by both power train output control based on the power train decelerator and brake control based on the brake device in a case of a demand for deceleration of the vehicle. The device comprises a target deceleration determiner which determines a target deceleration to be generated in the vehicle in a case of detection of a demand for deceleration of the vehicle, a turning state detector which detects a turning state of the vehicle, and a control amount calculator which calculates at least one of a power train output control amount of the power train controller and a brake control amount of the brake device based on the target deceleration determined by the target deceleration determiner and the turning state of the vehicle detected by the turning state detector.

The vehicle deceleration unit of the present invention detects the turning state of the vehicle, and calculates control amounts for power train output control and brake control based on the turning state and the target deceleration. Deceleration control of the vehicle is performed based on the control amounts for power train output control and brake control. Therefore, the vehicle may be stably braked.

Furthermore, the vehicle deceleration unit may further comprise a distance detector which detects a distance between the vehicle and another vehicle traveling ahead of the vehicle. The target deceleration determiner may determine a target deceleration based on the distance between both the vehicles detected by the distance detector. In this aspect, the distance between the vehicle and another vehicle traveling ahead of the vehicle is detected, and a target deceleration is determined based on the detected distance. Thus, it is possible to hold a following distance greater than a predetermined distance or prevent the vehicle from hitting another vehicle traveling ahead of the vehicle. If the vehicle is decelerated in such a case, the turning state of the vehicle is detected and taken into account during deceleration control. Therefore, the vehicle may be stably braked.

Also, the control amount calculator may determine a deceleration control distribution ratio between a driven wheel and a non-driven wheel based on the target deceleration determined by the target deceleration determiner and the turning state of the vehicle detected by the turning state detector. The control amount calculator may calculate a brake control amount and a power train output control amount of the driven wheel and may calculate a brake control amount of the non-driven wheel based on the determined deceleration control distribution ratio. In this aspect, it is possible to optimally balance deceleration through the driven wheel against deceleration through the non-driven wheel and decelerate the vehicle more stably, even when the vehicle is making a turn.

In addition, when calculating a brake control amount and a power train output control amount of the driven wheel, the setting of the power train output control amount may have precedence over the setting of the brake control amount. Therefore, it is possible to inhibit abrasion of the frictional members that are used during brake control and attenuate vibrations and noise generated by brake control.

Also, according to another aspect of the present invention, there is provided a vehicle control method comprising the steps of determining the target deceleration to be generated in the vehicle in a case of detection of a demand for deceleration of the vehicle, detecting the turning state of the vehicle, calculating at least one of the power train output control amount and the brake control amount based on the determined target deceleration and the detected turning state of the vehicle, and decelerating the vehicle based on at least one of the calculated power train output control amount and the calculated brake control amount.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENT

A vehicle deceleration unit in accordance with one embodiment of the present invention will be described. The vehicle deceleration unit of the following embodiment is installed in a rear-wheel drive vehicle. This vehicle is also equipped with an automatic transmission and a following distance holding system that holds a distance between the vehicle and a vehicle traveling ahead thereof constant. The following description will pertain to an example wherein the vehicle is decelerated based on a demand for deceleration from the following distance holding system. After detection of a demand for deceleration, the following distance holding system decelerates the vehicle using both power train output control and brake output control.

During deceleration by means of the power train output control, the vehicle may be decelerated through a shift-down operation, as well as reduction of output from the engine. The power train output control may be performed solely reducing output from the engine, or solely by performing a shift-down operation. Reduction of output from the engine may also be combined with a shift-down operation to accomplish the required deceleration. During brake control, the vehicle is decelerated by pressing a frictional member (a brake pad) against a wheel or a rotational portion that rotates together with the wheel (a brake disc). In this embodiment, a hydraulic brake mechanism utilizing hydraulic pressure is employed as a mechanism for pressing the brake pad against the brake disc.

Figure 1:
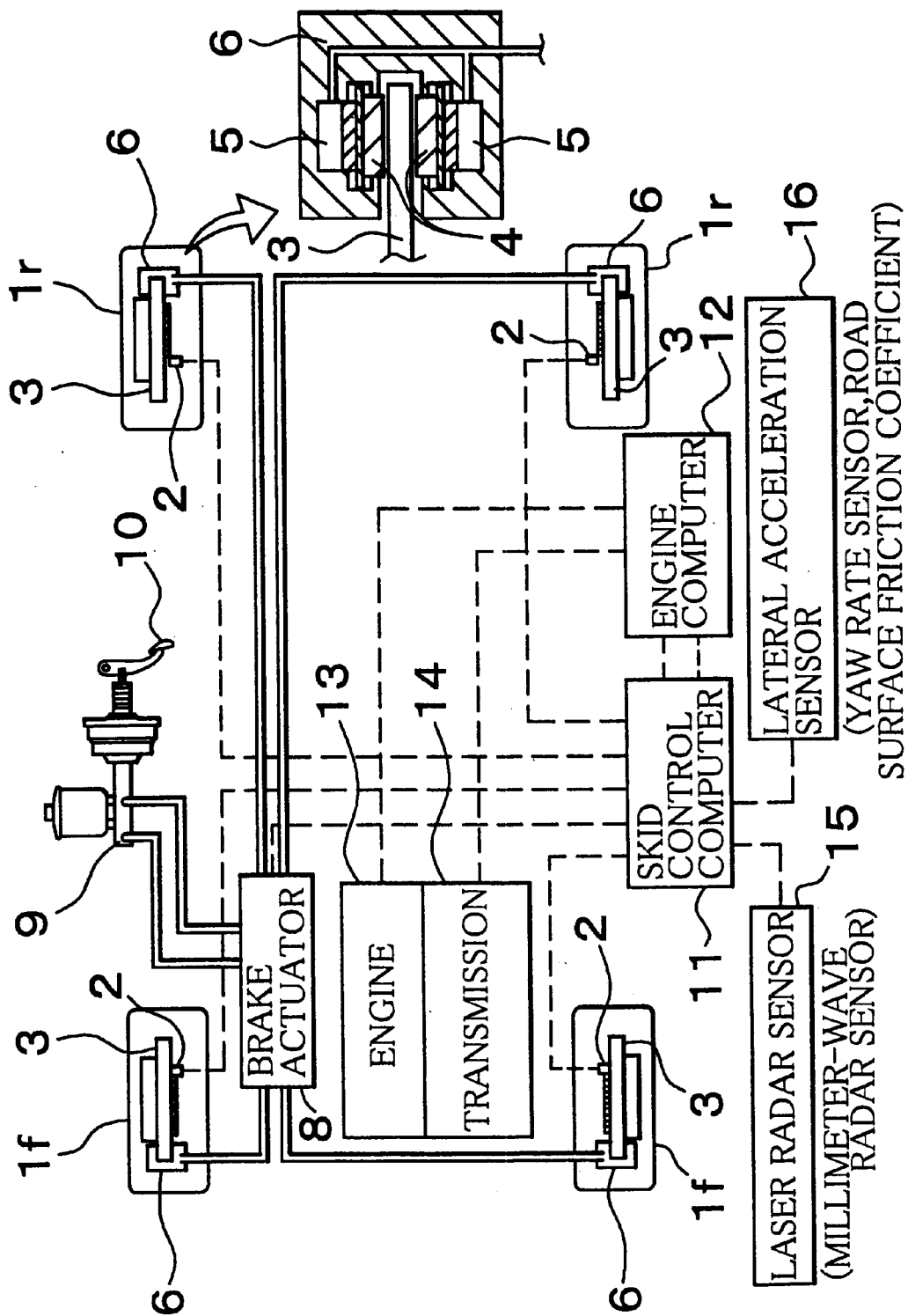
FIG. 1 is a structural view of a vehicle deceleration unit in accordance with one embodiment of the present invention.

The structure of a vehicle equipped with the vehicle deceleration unit of this embodiment will be described in detail. FIG. 1 shows the structure of the vehicle equipped with the vehicle deceleration unit of this embodiment.

A wheel speed sensor 2 is mounted to a front wheel 1f to detect the speed thereof, and another wheel speed sensor 2 is mounted to a rear wheel 1r to detect a speed thereof. A brake disc (a rotational portion) 3 is mounted to each of the front and rear wheels 1f, 1r. A brake caliper 6, into which a brake pad (a frictional member) 4 and a wheel cylinder 5 are built, is mounted to each brake disc 3. The wheel cylinders 5 are connected to a brake actuator 8 through brake lines 7.

The brake actuator 8 has a pump and a valve. In the case where the vehicle is decelerated when a brake pedal 10 is not depressed by a driver with the following distance holding system in operation, the pump in the brake actuator 8 feeds brake oil in a master cylinder 9 to the wheel cylinder 5 through the brake line 7. This increases hydraulic pressure in the wheel cylinder and presses the brake pad 4 against the brake disc 3. If the brake pad 4 is pressed against the brake disc 3, a frictional force inhibits the front and rear wheels 1f, 1r coupled to the brake disc 3 from rotating. Thereby the vehicle is decelerated.

Hydraulic pressure in the wheel cylinder 5 is adjusted by opening or closing the valve of the brake actuator 8, whereby a brake torque generated by the front and rear wheels 1f, 1r is adjusted. Even when the brake pedal 10 is depressed by the driver, hydraulic pressure is transmitted to the wheel cylinder 5 through the brake actuator 8. Although the brake system of this embodiment is a disc brake system, it is also possible to employ a drum brake system. In this case, a brake drum functions as the rotational portion, and a brake shoe functions as the frictional member.

The wheel speed sensors 2 and the brake actuator 8 are connected to a skid control computer 11 that comprehensively controls deceleration control of the vehicle. The skid control computer 11 is also connected to an engine computer 12 and coordinates brake control with power train output control. The engine computer 12 is connected to an engine 13 and a transmission 14 and comprehensively performs engine control, such as throttle opening degree control, fuel injection amount control, ignition timing control and air-fuel ratio control of the engine 13. The engine computer 12 can also detect the gear position of the transmission 14 and control change of gears.

The skid control computer 11 can calculate a vehicle speed from the speeds of the front and rear wheels 1f, 1r detected by the wheel speed sensors 2. It is also possible to calculate the slip rate of the wheels from outputs of the wheel speed sensors 2, as well as estimate the friction coefficient $\mu$ of a road surface from the slip rate and other pieces of information. In performing brake control, the skid control computer 11 calculates a brake control amount to generate brake torque in the front and rear wheels 1f, 1r, and sends a control signal to the brake actuator 8 based on the brake control amount.

The engine computer 12 collaborates with the skid control computer 11 to reduce output from the engine 13 by closing a throttle valve or performing power train output control down shifting the transmission 14. During this operation, the engine computer 12 calculates a power train output control amount and sends control signals to a motor for changing the opening degree of the throttle valve, or a solenoid valve for changing a gear position of the transmission 14.

In addition, a laser radar sensor 15 for detecting the distance between the vehicle and another vehicle traveling ahead thereof is also connected to the skid control computer 11. The laser radar sensor 15 radiates laser beams outputted from a built-in laser transmitter towards an area ahead of the vehicle. A light-receiving lens of the laser radar sensor 15 receives laser beams reflected by a reflector plate or the like of the vehicle traveling ahead. The laser radar sensor 15 uses a built-in microcomputer to calculate a period from radiation to receipt of laser beams and an incidence angle. Thereby the laser radar sensor 15 detects the presence of a vehicle traveling ahead and calculates a following distance. It is also possible to calculate the speed of one vehicle relative to the other vehicle (or a speed of the vehicle traveling ahead) by referring to the vehicle speed calculated from the wheel speed sensors 2. The millimeter-wave radar sensor or laser radar sensor may be employed as a sensor for detecting the distance between vehicles.

A lateral acceleration sensor 16 for detecting lateral acceleration acting on the vehicle is also connected to the skid control computer 11. In this embodiment, the turning state of the vehicle is judged from lateral acceleration detected by the lateral acceleration sensor 16. A yaw rate sensor for detecting the yaw rate of the vehicle may also be employed to judge the turning state of the vehicle. A road surface friction coefficient sensor may be employed for detecting a friction coefficient $\mu$ of a road surface. It is also possible to combine the yaw rate sensor with the road surface friction coefficient sensor.

In the aforementioned vehicle deceleration unit, the engine computer 12, the engine 13 and the transmission 14 function as power train decelerators. The brake discs 3, the brake pads 4, the wheel cylinders 5, the brake calipers 6, the brake lines 7, the brake actuator 8, the master cylinder 9 and the like function as brake decelerators. Furthermore, in this embodiment, the skid control computer 11 functions as a target deceleration determiner, and the lateral acceleration sensor 16 and the skid control computer 11 function as turning state detectors.

In this embodiment, the engine control computer 12 functions as a control amount calculator as to power train output control, and the skid control computer 11 functions as a control amount calculator as to brake control. In addition, the laser radar sensor 15 functions as a distance detector.

Figure 2:
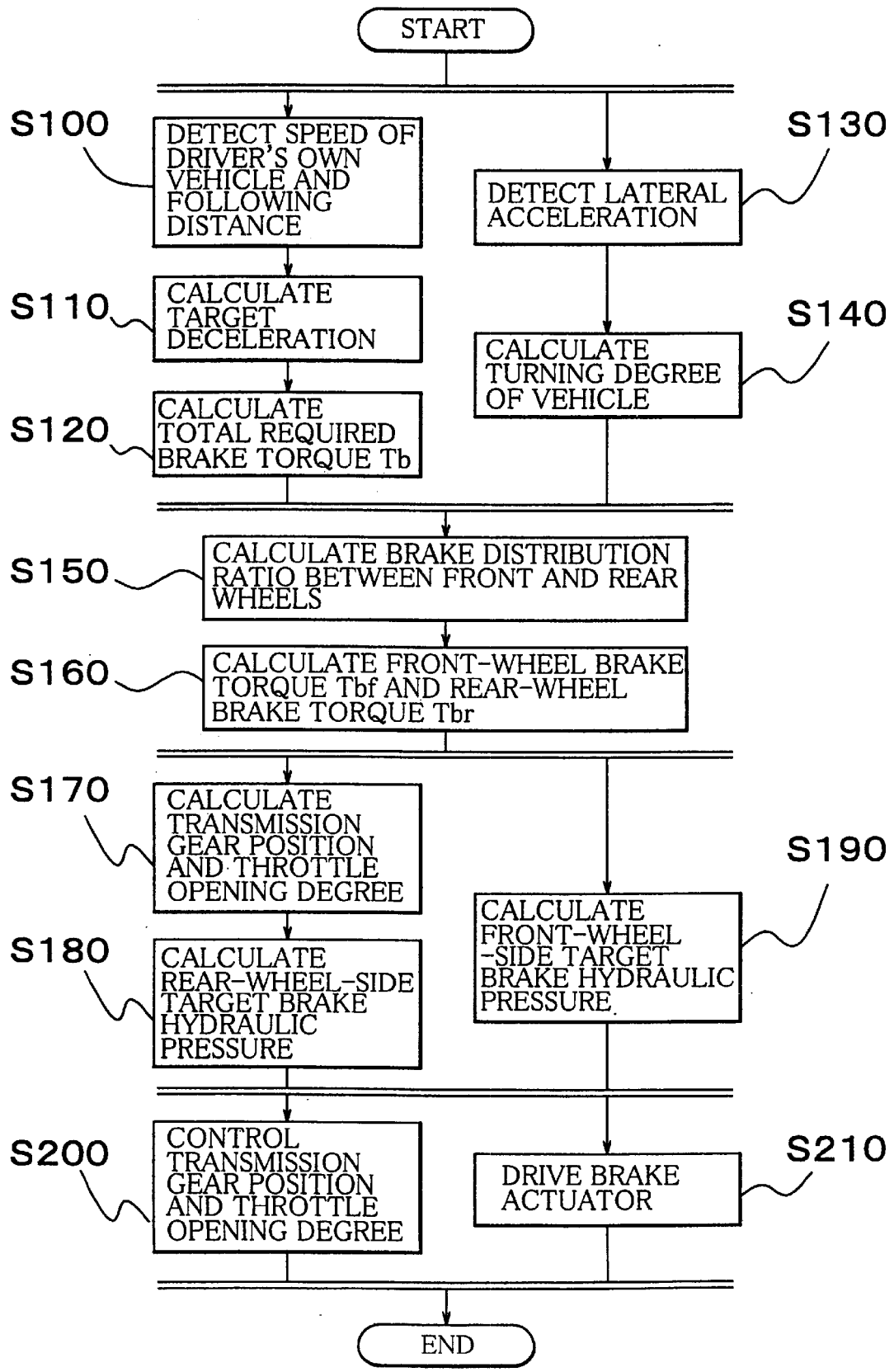
FIG. 2 is a flowchart of vehicle deceleration control performed by the vehicle deceleration unit shown in FIG. 1.

Deceleration control is performed by the vehicle deceleration unit of this embodiment. As described above, the vehicle deceleration unit of this embodiment decelerates the vehicle based on a demand for deceleration from the following distance holding system. FIG. 2 shows a flowchart of the deceleration control.

In the following description, it is to be noted that the processes from STEP 100 to STEP 120 are performed in parallel with the processes in STEP 130 and STEP 140 (Although these the processes are performed in parallel with each other in this embodiment, this is not absolutely necessary). First, a speed of the driver's own vehicle and a distance between the vehicle and another vehicle traveling ahead thereof is detected from outputs from the wheel speed sensors 2 and laser radar sensor 15 (STEP 100). Next, the skid control computer 11 calculates a target deceleration based on the speed of the driver's own vehicle and the distance between both the vehicles (STEP 110). Then, the skid control computer 11 calculates a total brake torque Tb required to generate the target deceleration in the vehicle (STEP 120). The lateral acceleration of the vehicle is detected based on an output signal from the lateral acceleration sensor 16 (STEP 130). Next, the skid control computer 11 calculates the turning degree of the vehicle based on the detected lateral acceleration (STEP 140).

Figure 3A:
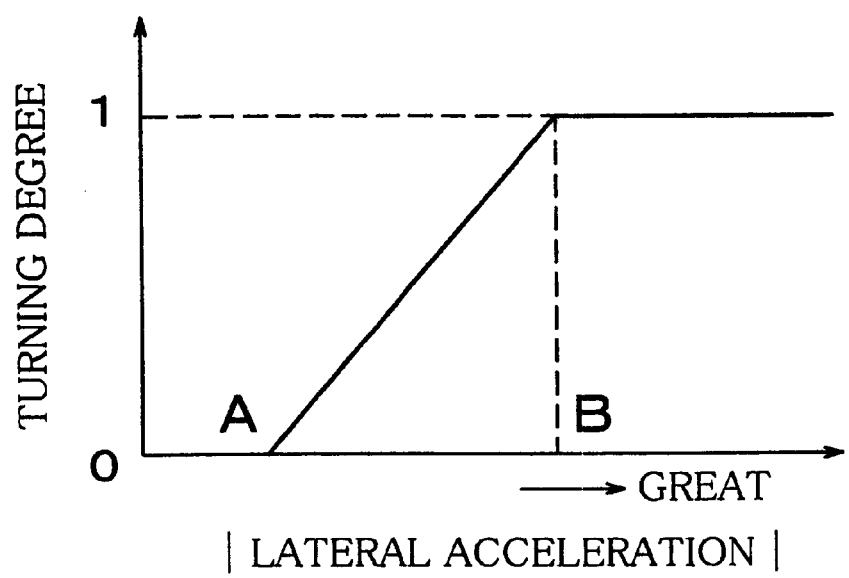
FIG. 3A is a map for calculating a turning degree from an absolute value of lateral acceleration.

FIG. 3A shows a map used in making this calculation. As shown in FIG. 3A, this map has an axis of abscissa indicative of an absolute value of lateral acceleration and an axis of ordinate indicative of a turning degree. The lateral acceleration at the time when the vehicle makes a right turn is different in sign from the lateral acceleration at the time when the vehicle makes a left turn. However, it does not matter in this embodiment whether the vehicle makes a right turn or a left turn. It is important to find the extent to which a turning state of the vehicle is far from (or close to) a limit state. Therefore, this embodiment uses an absolute value of lateral acceleration.

The turning degree assumes a value between 0 and 1. When the turning degree is equal to 0, the vehicle has hardly turned. When the turning degree is equal to 1, the vehicle has turned almost in a limit state. If the absolute value of lateral acceleration becomes equal to or greater than a certain value (a point A in FIG. 3A), it is determined that the vehicle is making a turn. As the lateral acceleration increases, the turning degree increases. If the absolute value of lateral acceleration becomes equal to or greater than a certain value (a point B in FIG. 3A), it is determined that the turning state of the vehicle has reached a limit state. Thus, the turning degree assumes a value of 1. Although a turning state of the vehicle is detected from lateral acceleration in this embodiment, other pieces of information may be used to detect a turning state of the vehicle.

Figure 3B:
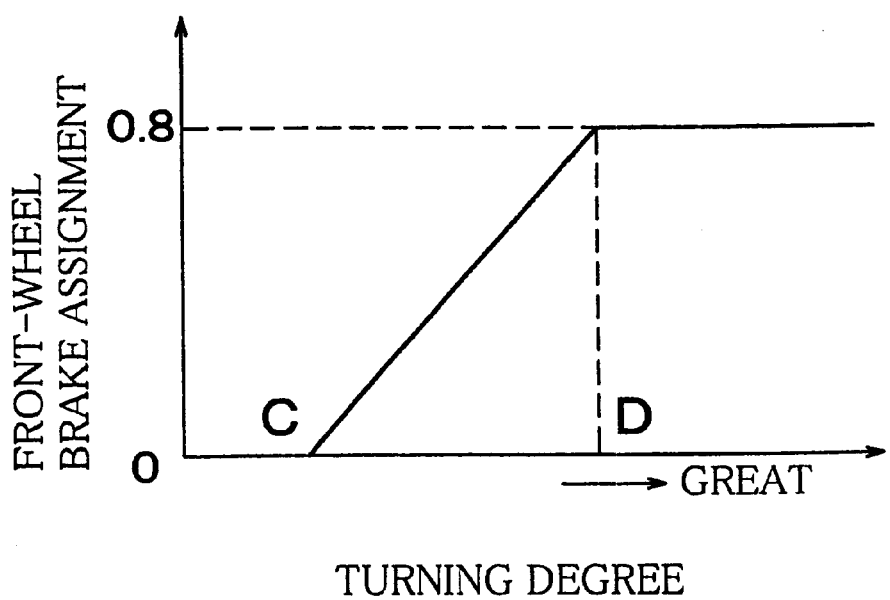
FIG. 3B is a map for calculating a front brake assignment from the turning degree.

Next, the skid control computer 11 calculates a brake distribution ratio between the front and rear wheels 1f, 1r based on a turning degree calculated in STEP 140 (STEP 150). FIG. 3B shows a map used for this calculation. As shown in FIG. 3B, this map has an axis of abscissa indicative of turning degree and an axis of ordinate indicative of front-wheel brake assignment. If a front-wheel brake assignment is determined, a rear-wheel brake assignment is also automatically determined. The front-wheel brake assignment assumes a value between 0 and 0.8, and the rear-wheel brake assignment assumes a value between 1 and 0.2.

If the turning degree becomes equal to or greater than a certain value (a point C in FIG. 3B) the skid control computer determines that the turning-state is becoming close to a limit state. Thus, the front brake assignment is gradually increased. If the brake torque generated by the rear wheel 1r becomes too great while the vehicle is making a turn close to a limit state, the vehicle is destabilized and likely to skid. Thus, part of the brake torque to be generated in the vehicle as a whole is generated by the front wheel 1f. The brake torque to be generated by the rear wheel 1r is reduced accordingly. Also, while the vehicle is being decelerated, a load applied to the rear wheel 1r decreases, and a load applied to the front wheel 1f increases. In order to stably decelerate the vehicle, it is effective to increase the brake assignment to the front wheel 1f.

If the turning degree is equal to or greater than a certain value (a point D in FIG. 3B), the brake assignment to the front wheel is set to 0.8. This is because stable deceleration of the vehicle cannot be expected even if a greater brake torque is applied to the front wheel 1f. After brake assignments to the front and rear wheels 1f, 1r have been determined, a front-wheel brake torque Tbf and a rear-wheel brake torque Tbr are calculated from the brake assignments and the total required brake torque Tb calculated in STEP 120 (STEP 160). The front-wheel brake torque Tbf and the rear-wheel brake torque Tbr are calculated according to the following equations (1) and (2) respectively.

front-wheel brake torque Tbf=Tb×front-wheel brake assignment (1)

rear-wheel brake torque Tbr=Tb−Tbf (or Tb×rear-wheel brake assignment) (2)

In the following description, it is to be noted that the processes in STEP 170 and STEP 180 are performed in parallel with a the processes in STEP 190 (Although these processes are performed in parallel with each other in this embodiment, this is not absolutely necessary).

Deceleration by means of the power train output control can be combined with deceleration by means of the brake control in the rear wheel drive vehicle of this embodiment. In STEP 170, the required gear position of the transmission 14 and the required throttle valve opening degree of the engine 130 are calculated (STEP 170).

Figure 4:
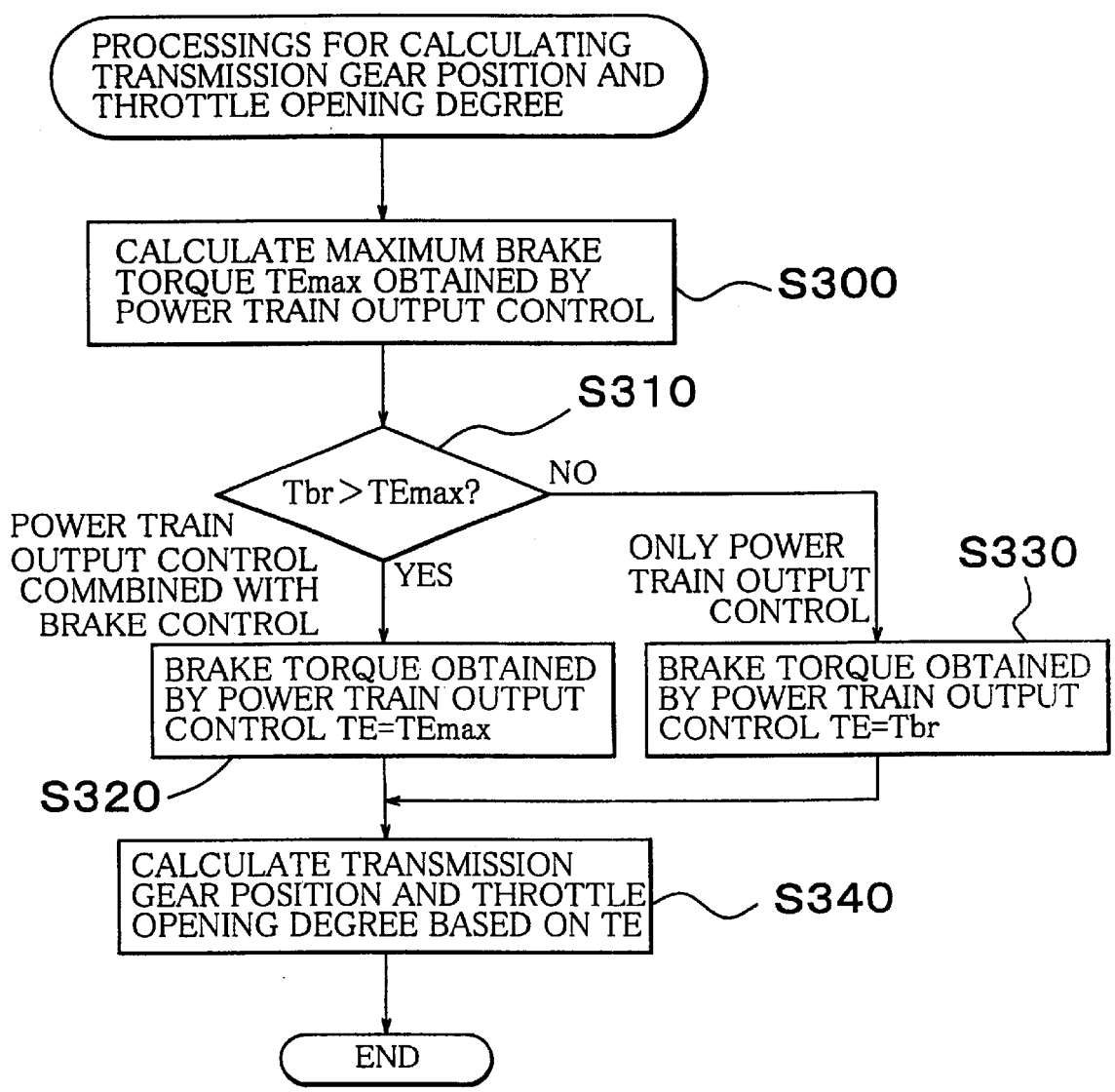
FIG. 4 is a flowchart for calculating a transmission gear position and a throttle opening degree.

The process in STEP 170 is performed as a subroutine. FIG. 4 shows a flowchart of this processing. The processing in STEP 170 will be described with reference to FIG. 4. First, a maximum brake torque TEmax that can be generated by the power train output control is calculated (STEP 300). The vehicle deceleration unit in the following distance holding system of this embodiment not only reduces an output from the engine 13 by closing the throttle valve but also performs power train output control. The transmission 14 of this embodiment is a five-speed automatic transmission, which may be down shifted to the third speed during deceleration by means of the following distance holding system. Thus, TEmax is calculated from the following equation (3).

TEmax=(engine brake torque when the throttle valve assumes its full-closure state)/(total gear ratio in the third gear) (3)

Next, it is determined whether or not the rear-wheel brake torque Tbr to be generated by the rear wheel $1r$ is greater than TEmax (STEP 310). If the rear-wheel brake torque Tbr is greater than TEmax, the brake torque TE to be generated by means of power train output control is made equal to TEmax (STEP 320). However, in this case, since the entire rear-wheel brake torque Tbr cannot be generated solely by power train output control, it is also necessary to generate brake torque by means of brake control. This will be described later.

If the rear-wheel brake torque Tbr is equal to or smaller than the TEmax that has been calculated, the entire rear-wheel brake torque Tbr can be generated solely by power train output control. Thus, the brake torque TE to be generated by power train output control is made equal to Tbr (STEP 330). Next, the engine computer 12 calculates the gear position of the transmission 14 and the opening degree of the throttle valve based on the TE that has been determined in STEP 320 or STEP 330 (STEP 340).

At this moment, if there are a plurality of gear positions that can achieve the TE that has been determined, the highest gear position is selected. This is preferable because it will weaken the a sense of incongruity conveyed to the driver. However, in the case where abrupt deceleration is judged by the system to be necessary, it is also possible to select a lower gear position.

Referring again to the flowchart shown in FIG. 2, after the gear position of the transmission 14 and the opening degree of the throttle valve have been calculated in STEP 170, the skid control computer 11 calculates a rear-wheel-side target brake hydraulic pressure for the rear wheel $1r$ (STEP 180). The rear-wheel-side target brake hydraulic pressure for brake control is calculated from the following equation (4).

rear-wheel-side target brake hydraulic pressure= [(Tbr−TE)/2]/Kbr (4)

Because there are two rear wheels $1r$, a target brake hydraulic pressure for each of the rear wheels $1r$ is calculated as follows. The brake torque TE generated by means of power train output control is subtracted from the total required brake torque Tb. The value thus obtained is halved and further divided by a conversion coefficient Kbr. In this manner, a target brake hydraulic pressure for each of the rear wheels $1r$ is calculated. The conversion coefficient Kbr represents a brake torque that is generated per unit hydraulic pressure. Since brake control of this embodiment is performed by the hydraulic brake mechanism, the target hydraulic pressure is calculated in this manner. If TE is made equal to Tbr in STEP 330 (FIG. 4), the target hydraulic pressure becomes equal to 0, and a brake torque is generated in the rear wheel $1r$ solely by means of power train output control.

After the front-wheel brake torque Tbf has been calculated in STEP 160, the skid control computer 11 calculates a front-wheel-side target brake hydraulic pressure for the front wheel $1f$ (STEP 190). In this embodiment, since the front wheel $1f$ is a non-driven wheel, its entire brake torque is generated by means of brake control. The front-wheel-side target brake hydraulic pressure for brake control is calculated from the following equation (5).

front-wheel-side target brake hydraulic pressure=(Tbf/2)/Kbf (5)

A conversion coefficient Kbf in equation (5) is similar to the aforementioned conversion coefficient Kbr for the rear wheel. Because the conversion coefficient Kbr for the rear wheel is different from the conversion coefficient Kbf for the front wheel, they are discriminated from each other in this embodiment.

If both STEP 180 and STEP 190 have been terminated, the engine computer 12 performs shift-down control of the transmission 14 and close control of the throttle valve based on the determined gear position and the throttle opening degree (STEP 200). This generates brake torque by means of power train output control.

The skid control computer 11 drives the brake actuator 8 based on the target brake hydraulic pressures that have simultaneously been determined for the front and rear wheels (STEP 210). By driving the brake actuator 8, brake hydraulic pressures are transmitted to the wheel cylinders for the front and rear wheels $1f$, $1r$ through the brake lines 7. Thereby the brake pads 4 are pressed against the brake discs 3, and a brake torque is generated by means of brake control. The process in STEP 200 is performed in parallel with the process in STEP 210. The processes in STEP 200 and STEP 210 are not started unless both the processes in STEP 180 and STEP 190 are terminated (Although these processes are performed in parallel with each other in this embodiment, this is not absolutely necessary).

As described above, a turning state of the vehicle is detected, and this turning state is taken into account during deceleration control. Therefore, even if the vehicle is making a turn close to the limit state, it is possible to stably decelerate the vehicle. In this embodiment, the distance between the driver's own vehicle and another vehicle traveling ahead thereof is detected, and a target deceleration is determined based on the distance to decelerate the vehicle. Thus, it is possible to hold a constant following distance or prevent collision with the vehicle traveling ahead. If the vehicle is making a turn close to the limit state, it is still possible to stably decelerate the vehicle.

Furthermore, a deceleration control distribution ratio between the driven wheel (the rear wheel $1r$) and the non-driven wheel (the front wheel $1f$) is determined. Based on the deceleration control distribution ratio, a power train output control amount and a brake control amount for the driven wheel and a brake control amount for the non-driven wheel are determined. Thus, deceleration through the driven wheel can optimally be balanced against deceleration through the non-driven wheel. Even if the vehicle is making a turn close to the limit state, it is possible to more stably decelerate the vehicle. In this case, since power train output control has precedence over brake control as to the driven wheel, it is also possible to inhibit abrasion of the frictional members used during brake control and attenuate vibrations and noise generated by brake control.

The vehicle deceleration unit in accordance with the present invention is not limited to that of the aforementioned embodiment. For example, in the description of the aforementioned embodiment, the vehicle deceleration unit is applied to a rear-wheel-drive vehicle. However, this unit can also be applied to a front-wheel-drive vehicle or an all-wheel-drive vehicle. The vehicle deceleration unit of the present invention can be applied to an all-wheel-drive vehicle of the type wherein a driving force is constantly transmitted to all the wheels and an all-wheel-drive vehicle of the type wherein assignment of a driving force to the wheels is variably controlled in accordance with an operation state.

Furthermore, the aforementioned embodiment deals with an example of the deceleration unit that operates during deceleration control of the following distance holding system. However, the present invention is not limited to such an example. That is, the present invention can be applied to any deceleration unit. The demand for deceleration may be issued automatically through various control devices installed in the vehicle. The demand may also be issued based on an operation by the driver or through some means outside the vehicle.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A vehicle deceleration unit comprising:
   a power train decelerator which controls a power train output to decelerate a vehicle;
   a brake device which presses a frictional member against a wheel or a rotational portion rotating together with the wheel to decelerate the vehicle;
   a target deceleration determiner which determines a target deceleration to be generated in the vehicle in a case of detection of a demand for deceleration of the vehicle;
   a turning state detector which detects a turning state of the vehicle; and
   a control amount calculator which calculates at least one of a power train output control amount of the power train decelerator and a brake control amount of the brake device based on the target deceleration determined by the target deceleration determiner and the turning state of the vehicle detected by the turning state detector.

2. The vehicle deceleration unit according to claim 1, further comprising:
   a distance detector which detects a distance between the vehicle and another vehicle traveling ahead of the vehicle, wherein:
      the target deceleration determiner determines a target deceleration based on the distance between both the vehicles detected by the distance detector.

3. The vehicle deceleration unit according to claim 2, wherein:
   the control amount calculator determines a deceleration control distribution ratio between a driven wheel and a non-driven wheel based on the target deceleration determined by the target deceleration determiner and the turning state of the vehicle detected by the turning state detector.

4. The vehicle deceleration unit according to claim 3, wherein:
   the control amount calculator calculates a brake control amount and a power train output control amount of the drive wheel and calculates a brake control amount of the non-driven wheel based on the determined deceleration control distribution ratio.

5. The vehicle deceleration unit according to claim 4, wherein:
   the setting of the power train output control amount has precedence over the setting of the brake control amount when calculating the brake control amount and the power train output control amount of the driven wheel.

6. The vehicle deceleration unit according to claim 1, wherein:
   the control amount calculator determines a deceleration control distribution ratio between a driven wheel and a non-driven wheel based on the target deceleration determined by the target deceleration determiner and the turning state of the vehicle detected by the turning state detector.

7. The vehicle deceleration unit according to claim 6, wherein:
   the control amount calculator calculates a brake control amount and a power train output control amount of the drive wheel and calculates a brake control amount of the non-driven wheel based on the determined deceleration control distribution ratio.

8. The vehicle deceleration unit according to claim 7, wherein:
   the setting of the power train output control amount has precedence over the setting of the brake control amount when calculating the brake control amount and the power train output control amount of the driven wheel.

9. The vehicle deceleration unit according to claim 1, wherein:
   the turning state detector includes at least one of a lateral acceleration sensor for detecting a lateral acceleration acting on the vehicle, a yaw rate sensor for detecting a yaw rate of the vehicle, a friction coefficient sensor for detecting a friction coefficient between the wheel and a road surface.

10. The vehicle deceleration unit according to claim 9, wherein:
    the turning state detector detects a turning state of the vehicle based on a value relating to at least one of the detected lateral acceleration, the detected yaw rate and the detected friction coefficient.

11. The vehicle deceleration unit according to claim 1, wherein:
    the control amount detector calculates a transmission gear position or a throttle opening degree as the power train output control amount.

12. The vehicle deceleration unit according to claim 1, wherein:
    the control amount detector calculates a brake pressure generating a pressing force applied to the frictional member as the brake control amount.

13. A vehicle deceleration control method comprising the steps of:
    determining a target deceleration to be generated in the vehicle in a case of detection of a demand for deceleration of the vehicle;
    detecting a turning state of the vehicle;
    calculating at least one of a power train output control amount and a brake control amount based on the determined target deceleration and the detected turning state of the vehicle; and
    decelerating the vehicle based on at least one of the calculated power train output control amount and the calculated brake control amount.

14. The vehicle deceleration control method according to claim 13, further comprising the step of:

detecting a distance between the vehicle and another vehicle traveling ahead of the vehicle, wherein:

the target deceleration is determined based on the detected distance between the vehicles.

15. The vehicle deceleration control method according to claim 14, wherein:

a deceleration control distribution ratio between a driven wheel and a non-driven wheel is determined based on the determined target deceleration and the detected turning state of the vehicle; and a brake control amount and a power train output control amount of the driven wheel are calculated and a brake control amount of the non-driven wheel is calculated based on the determined deceleration control distribution ratio.

16. The vehicle deceleration control method according to claim 15, wherein:

the setting of the power train output control amount has precedence over the setting of the brake control amount when calculating the brake control amount and the power train output control amount of the driven wheel.

17. The vehicle deceleration control method according to claim 13, wherein:

a deceleration control distribution ratio between the driven wheel and the non-driven wheel is determined based on the determined target deceleration and the detected turning state of the vehicle; and a brake control amount and a power train output control amount of the driven wheel are calculated and a brake control amount of the non-driven wheel is calculated based on the determined deceleration control distribution ratio.

18. The vehicle deceleration control method according to claim 17, wherein:

the setting of the power train output control amount has precedence over the setting of the brake control amount when calculating the brake control amount and the power train output control amount of the driven wheel.

* * * * *